(12) United States Patent
Whitbread et al.

(10) Patent No.: US 6,614,213 B1
(45) Date of Patent: Sep. 2, 2003

(54) OPTICAL POWER MEASUREMENT IN PHOTONIC INTEGRATED DEVICES

(75) Inventors: Neil D Whitbread, Northhampton (GB); Andrew C Carter, Blisworth (GB); Michael J Wale, Greens Norton (GB)

(73) Assignee: Bookham Technology p.l.c. (GB)

( * ) Notice: Subject to any disclaimer, the term of this patent is extended or adjusted under 35 U.S.C. 154(b) by 0 days.

(21) Appl. No.: 09/720,635

(22) PCT Filed: Jan. 7, 1999

(86) PCT No.: PCT/GB99/02089

§ 371 (c)(1),
(2), (4) Date: Mar. 1, 2001

(87) PCT Pub. No.: WO00/02260

PCT Pub. Date: Jan. 13, 2000

(30) Foreign Application Priority Data

Jul. 2, 1998 (GB) .............................................. 9814252

(51) Int. Cl.$^7$ ......................... G01R 31/02; G01R 31/00
(52) U.S. Cl. ........................................... 324/72; 324/96
(58) Field of Search ..................... 324/72, 96

(56) References Cited

U.S. PATENT DOCUMENTS

| 4,369,363 A | * | 1/1983 | Quint et al. | 250/214.1 |
| 4,846,561 A | | 7/1989 | Soileau, Jr. et al. | 350/354 |
| 4,893,162 A | | 1/1990 | Gentner et al. | 357/30 |
| 5,239,183 A | * | 8/1993 | Kouno et al. | 250/559.31 |
| 5,299,057 A | | 3/1994 | Rideout et al. | 359/345 |
| 5,652,817 A | * | 7/1997 | Brinkman et al. | 385/37 |

FOREIGN PATENT DOCUMENTS

| EP | 0 565 993 A1 | 4/1993 |
| GB | 2 290 375 A | 12/1995 |

OTHER PUBLICATIONS

*Ultrafast Optical Thresholding Based on Two–Photon Absorption GaAs Waveguide Photodetectors*, Z. Zheng, et al., IEEE Photoonics Technology Letters, vol. 9, No. 4, pp/ 493–495.

*The Two–Photon Absorption Semiconductor Waveguide Autocorrelator*, Frances R. Laughton, et al., 8106 IEEE Journal of Quantum Electronics, Mar. 30, 1994, No. 3, New York, pp. 838–845.

* cited by examiner

*Primary Examiner*—N. Le
*Assistant Examiner*—John Teresinski
(74) *Attorney, Agent, or Firm*—Kirschstein, et al.

(57) ABSTRACT

A photonic integrated device includes a waveguide of semiconductor material and a detector for measuring optical power of light traveling along the waveguide. The detector which is monolithically integrated into the device measures a photocurrent on an electrode which has been generated in the waveguide by two photon absorption.

10 Claims, 3 Drawing Sheets

OPTICAL POWER MEASUREMENT IN PHOTONIC INTEGRATED DEVICES

BACKGROUND OF THE INVENTION

This invention relates to photonic integrated devices, also referred to as photonic integrated circuits or optoelectronic integrated circuits, and is more especially concerned with measuring optical power in such devices.

A photonic integrated device produces a discernible change in a characteristic of light generated by it, passing through it or absorbed by it. Such a circuit may convert electricity into light or vice versa such as for example in an optical transmitter or receiver module for use in an optical telecommunications system. Alternatively it may change the power level of the light such as in an optical modulator or a splitter or a coupler, whether tunable or otherwise. The device may change a characteristic particular to the light such as its phase or frequency. A photonics integrated device can comprise a single device which is constructed in a monolithic form or comprise two or more such devices which are monolithically integrated together, giving rise to the term photonics integrated circuit. In particular photonics integrated devices may integrate, for example, interferometers, photodiodes, phase shifters, modulators, couplings, gratings and filters.

Optical power monitoring of photonic integrated circuits during their operation is essential in maintaining optimum performance. In optical telecommunications light power levels of several mW are typical though they can be up to several hundred mW in the case of pump lasers for fibre amplifiers. It is known in packaged laser modules to use a back-facet PIN photodiode to measure the optical power and this is usually integrated using hybrid techniques. However, for photonic integrated devices which contain only non-absorbing waveguides, such as electro-optic modulators, it is difficult to monolithically integrate photodiodes since the latter are based on materials having a high linear absorption. To integrate such devices requires regrowth techniques to form an absorbing PIN photodiode. Such techniques are time consuming and costly. Furthermore, since conventional photodiodes absorb nearly 100% of light incident on them, they must not be placed directly in the path of the optical power travelling through the waveguides. Therefore optical splitters are used to tap-off a certain fraction of the optical power from the waveguides. This further adds to the complexity and cost of fabricating the device.

In IEEE Photonics Technology Letters Volume 9 No. 4, April 1997, pages 493–495 there is disclosed an optical detector which comprises a GaAs ridge waveguide which measures optical power by measuring a two photon absorption photocurrent in the waveguide.

SUMMARY OF THE INVENTION

A need exists therefore for a method or an apparatus for measuring optical power in a photonics device which at least in part overcomes the limitations of the known arrangements.

According to the invention there is provided a photonic integrated device having a waveguide of semiconductor material which is monolithically integrated into the device and which has a low linear absorption at an intended wavelength of operation of the device, said device being arranged to perform a discernible change in a characteristic of light generated by it, passing through it or absorbed by it and characterized by an optical power detector which comprises means associated with said waveguide for measuring a photocurrent generated in the waveguide by two photon absorption without substantially affecting the light passing along the waveguide.

Two photon absorption (TPA) is a non-resonant, non-linear optical process which occurs in semiconductor materials for photons with energy less than the semiconductor band-gap $E_g$, but greater than $E_g/2$. The process occurs when an electron is excited from the valence band to an intermediate virtual state between the valence band and the conduction band by absorbing a first photon and is excited from the intermediate virtual state to the conduction band by absorbing a second photon. The intermediate virtual state can be any state in any band, although the transition probability is highest when the energy difference between the states involved is smallest, that when the intermediate state lies closest to the upper valence band or lower conduction band. A particular advantage of using TPA is that since only a small faction of the light is absorbed this eliminates the need for an optical splitter and a separate detector. Furthermore the detector can be readily monolithically integrated into devices having a waveguide of semiconductor material which is non-absorbing. Generally TPA is considered a parasitic effect though it has been proposed to use TPA in autocorrelators to measure pulse widths such as described in "The Two-Photon Absorption Semiconductor Waveguide Autocorrelator", IEEE Journal of Quantum Electronics, volume 30, number 3 and "Autocorrelation Measurements of Modelocked Nd:YLF Laser Pulses Using Two-Photon Absorption Waveguide Autocorrelator", IEEE Photonics Technology Letters, volume 9, number 5.

Preferably the waveguide transmits all of the light within the device rather than being branch thereof. That is, the detector is preferably an in-line device which detects light passing through the waveguide on its way to be used in a subsequent operation. The detector therefore acts as a power tap which taps-off a small proportion of light travelling through the waveguide. By "small amount" it is meant less than 20%. It may tap-off as little as less than 10%, 5% or even 1% depending on the waveguide material, the wavelength and optical power of the light.

The detector may be used to detect light in the range 200 nm to 4000 nm, and especially in the sub-range 800 nm to 1600 nm. Most preferably it is used to detect light in the regions of 1300 nm and 1550 nm.

Most preferably the means comprises one or more electrodes provided on the waveguide. Advantageously the or each electrode forms a Schottky contact with the waveguide material. A particular advantage of using electrodes which form a Schottky contact is that electrical isolation between the electrodes and/or any other electrodes which may be present in the device can be readily achieved by selective removal of the electrode material thereby eliminating the need for selective etching of the waveguide as would be required for an Ohmic contact. Although a Schottky contact is not able to withstand high currents it is ideally suited for measuring the relatively small TPA current.

Most preferably the or each electrode comprises metallic aluminum. In a preferred fabrication of the device the semiconductor waveguide material comprises gallium arsenide and gallium aluminum arsenide.

The device can have one or more light inputs and one or more light outputs and can be selected from a group of devices comprising an interferometer, a photodiode, a phase shifter, a modulator, a coupler, a grating, a filter, a beam former, a laser, an optical add-drop multiplexer or an optical cross connection. Most preferably the device comprises a Mach Zehnder type optical modulator.

According to a second aspect of the invention there is a method of measuring optical power in a photonics integrated device of a type having a waveguide of semiconductor material which is monolithically integrated into the device and which has a low linear absorption at an intended wavelength of operation of the device, said device being arranged to perform a discernible change in a characteristic of light generated by it, passing through it or absorbed by it, the method characterised by measuring a photocurrent generated in the waveguide by two photon absorption.

Advantageously the measured optical power is used to control or monitor the operation of the device. The measured optical power can for example be used to control the operation of the device by using a feedback arrangement. Alternatively the measured optical power can be used to detect data signals present in the light and change the operation of the device in response to the data signals.

An embodiment of the invention will now be described by way of example only with reference to the accompanying drawings in which:

DETAILED DESCRIPTION OF THE PREFERRED EMBODIMENTS

Figure 1:
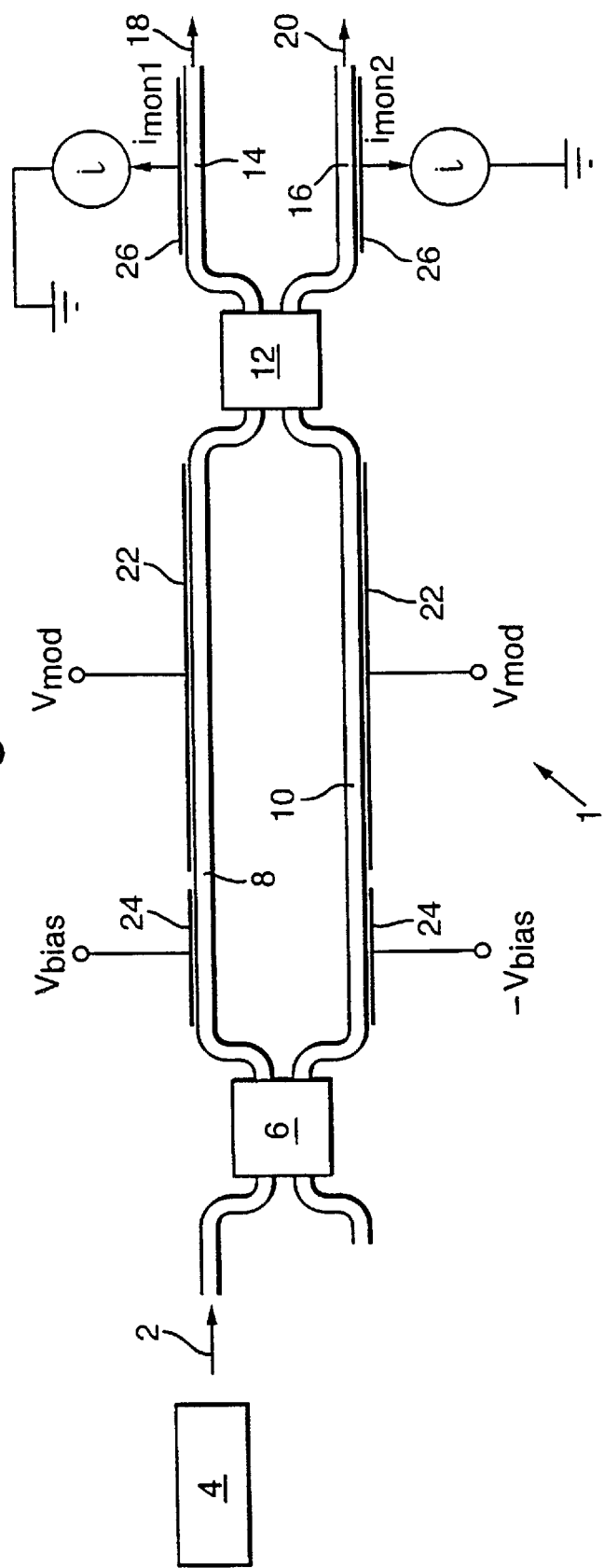
FIG. 1 shows a schematic representation of a Mach-Zehnder optical modulator in accordance with the invention.

Referring to FIG. 1 there is shown a Mach-Zehnder GaAs/AlGaAs optical modulator 1 which is used to modulate laser light 2 provided by a laser source 4 in respect to a modulating signal $V_{mod}$. The light 2 is split using a 3dB multi-mode interference (MMI) coupler 6 and fed into optical waveguides 8 and 10. The laser light travels along each waveguide 8, 10 to a second MMI coupler 12 at which point it is re-combined to form separate optical outputs (channels) 18 and 20 which travel along respective waveguides 14, 16.

Figure 2:
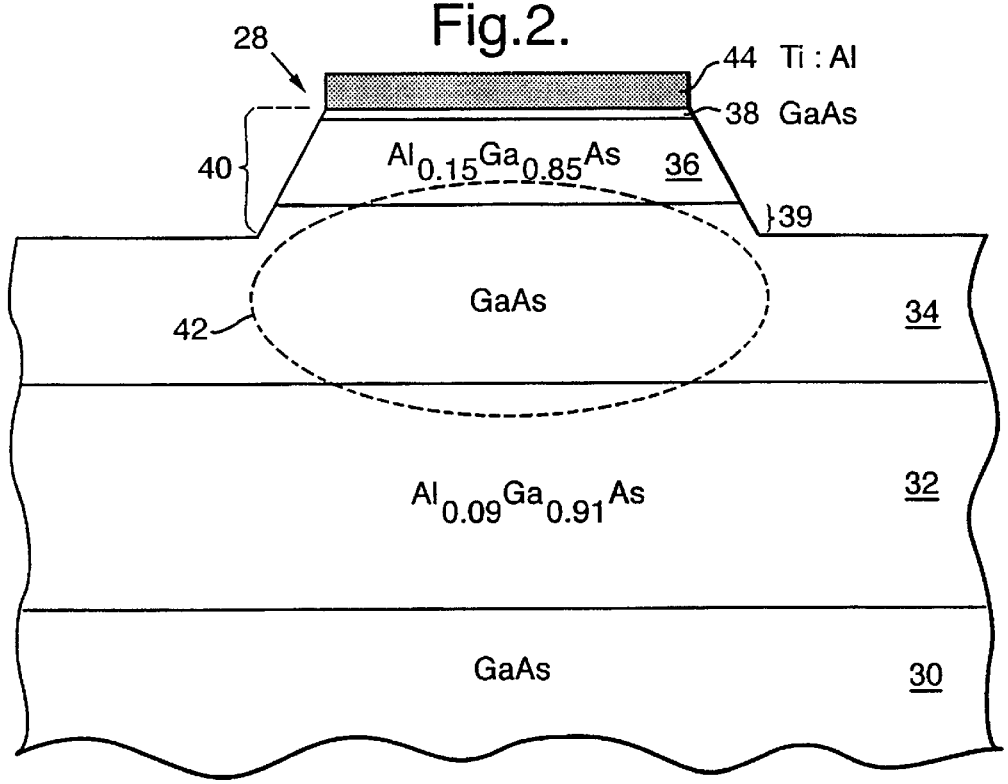
FIG. 2 shows a cross-section through a waveguide of the modulator of FIG. 1.

Modulating electrodes 22 and bias control electrodes 24 are provided on the waveguides 8, 10 and power monitoring electrodes 26 on the waveguides 14, 16. A cross-section of the waveguide 8 is shown in FIG. 2 which shows its optical waveguide structure 28. The waveguide structure 28 is identical for each of the waveguides 8, 10, 14 and 16 and comprises a semi-insulating GaAs substrate 30 which supports, in turn, a cladding layer 32 of $Al_{0.09}Ga_{0.91}As$ having a thickness of 3.1 μm, an optical waveguiding layer 34 of GaAs having a thickness of 1.95 μm and a further cladding layer 36 of $Al_{0.15}Ga_{0.85}As$ having a thickness of 0.85 μm. The cladding layer 36 supports a GaAs cap 38 having a thickness of 25 nm. Since the cladding layers 32 and 36 have a relatively lower refractive to that of the optical guiding layer 34 this provides vertical confinement of light to substantially within the layer 34.

An upper region 39 of the layer 34, the cladding layer 36 and the cap 38 together form a ridge structure 40 which through a dielectric loading effect provides lateral confinement of light within the layer 34 as shown by the area bounded by the dashed line 42. The GaAs layer 28 thus acts as an optical waveguide. The ridge structure 40 is of tapering form having a wide base and a narrow top. At its base it is 5 μm wide. It has a height of 1.2 to 1.3 μm. Although a ridge structure 40 of tapering form is described, it could equally be provided with vertical sidewalls. The configuration is determined by the etch process used to define the ridge structure 40.

The ridge structure 40 is crowned with a metallic aluminum (Al) contact electrode 44. The contact electrode 44, which is deposited on a thin layer of titanium (Ti) to ensure good adhesion to the cap 38, forms a Schottky contact with the GaAs cap 38. Referring back to FIG. 1 momentarily, the modulating 22, bias control 24 and power monitoring 26 electrodes are provided by depositing the Ti:Al contact electrodes over the whole of the upper surface of the ridge structure and then selectively removing the metallic layer to define the respective electrode. Since the electrode layer is made of metallic aluminum and forms a Schottky contact, removal of the metal provides electrical insulation between the electrodes. It will be appreciated that the electrodes could be formed as Ohmic contacts though such an arrangement would then require etching of the GaAs cap 38 to provide the desired electrical insulation.

In a known manner the modulator 1 is operated by applying a modulating signal $V_{mod}$ across the modulating electrodes 22 to cause a differential phase shift in the light passing along the waveguides 8 and 10 so as to modulate the light 2 when it is recombined by the coupler 12. The bias control electrodes 24 are provided to allow the device 1 to be pre-biased to a given operating point which, during normal operation, is such that the two optical outputs 18 and 20 are in balanced quadrature. This output state is selected since it corresponds to minimum second-harmonic distortion from the modulator 1.

The power monitor electrodes 26 are provided to measure the photocurrent generated by each light output 18, 20 which is used to control the modulator to ensure the optical outputs are in balanced quadrature. As described the waveguide 14, 16 comprise the GaAs layer 34 and this has a band-gap of 1.424 eV at room temperature which corresponds to the photon energy of light having a wavelength of 870 nm. Thus TPA can occur in the GaAs layer 34 at the preferred optical communication wavelengths of 1300 nm and 1550 nm. The presence of the power monitoring electrodes 26 gives rise to a depletion region which extends into the guiding region of the waveguides. This allows the waveguides to be used as photodiodes. It will be appreciated however that TPA occurs along the entire extent of the waveguides and consequently a photocurrent could be detected via the modulating electrode 22 or bias electrode 24, however this can be difficult to detect when a bias $V_{bias}$ or modulating voltage $V_{mod}$ is applied to the respective electrode.

Figure 3:
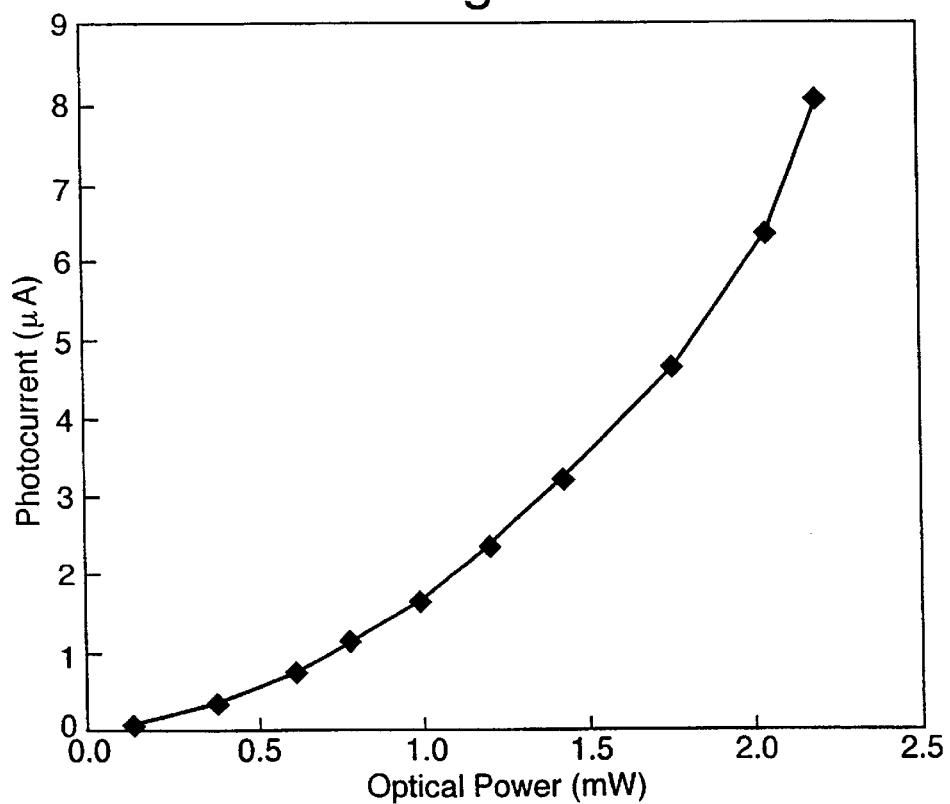
FIG. 3 shows a graph of photocurrent versus optical power in the waveguide.

FIG. 3 shows a plot of measured photocurrent generated in the waveguide 14 or 16 (as measured by via the power monitoring electrode 26) versus optical power. A significant feature of FIG. 3 is that it shows a square law relationship between photocurrent and optical power. This arises from the fact that two photons are involved in the TPA process, that is only one electron-hole pair is generated for every two photons absorbed in the semiconductor waveguide. As a consequence of two photons being involved, the internal quantum efficiency of a TPA photodiode is half that of conventional linear photodiodes for similar absorbed powers.

Optical communications generally use guided light having powers of up to about 10 mW. Up to this value TPA is quite inefficient and therefore the power of the guided light can readily be monitored whilst only losing a small fraction of its power. A waveguide having a linear loss of 0.5 dB/cm, providing an output power of 2 mW, will, according to FIG. 3, absorb only 0.7% of the light and will generate a photocurrent of 6.5 $\mu$A. Due to the nonlinear characteristic of TPA, this percentage will vary in proportion to the guided optical power.

A further feature to note from the plot is that for an output power per channel of only 2 mW a photocurrent of 6.5 $\mu$A is generated which is readily useable for active control of the device using an electronic feedback arrangement.

Active control obviates manual pre-setting of the modulator 1. It can also compensate for variations in the correct bias voltage due to effects such as temperature fluctuations. If a suitable arrangement of feedback electronics is provided, signals from the power monitor electrodes 26 can be applied to the bias control electrodes 24 in order to set and maintain the two output channels automatically in balanced quadrature.

Figure 4:
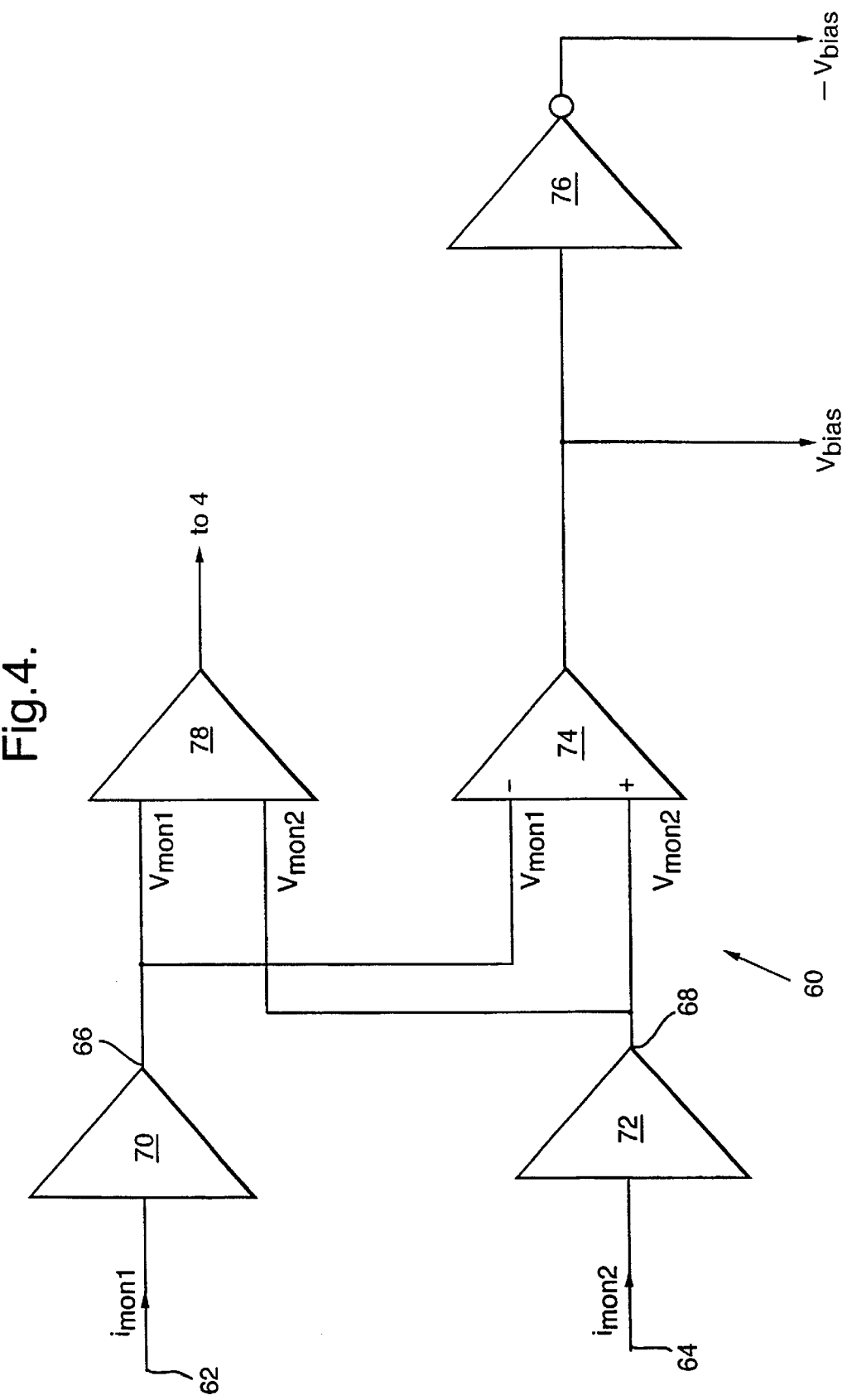
FIG. 4 shows a schematic representation of an electronic feedback arrangement for operating the modulator of FIG. 1.

FIG. 4 shows a block diagram of an electronic feedback arrangement 60 for this purpose. The photocurrents ($i_{mon1}$) 62 and ($i_{mon2}$) 64 from the power monitor electrodes 26 are converted into voltage signals ($V_{mon1}$) 66 and ($V_{mon2}$) 68 using transimpedance amplifiers 70 and 72. The difference between the voltage signals 66 and 68 is amplified in a difference amplifier 74 and used to drive the two bias control electrodes 24. These electrodes work on an antagonistic basis and so an inverter 76, which is simply an amplifier with a gain of −1, is used to provide dual polarity output $V_{bias}$, −$V_{bias}$. Also, by summing the voltage signals 66 and 68 in a summing amplifier 78, the total mean power output of the modulator 1 can be monitored. This can then be fed back to control electronics which control the laser source 4 so as to stabilize its optical light power output. In order to minimize parasitic oscillations in the control electronics, the monitor signals 62 and 64 should be low-pass filtered in some way, for example by using RC feedback networks in the transimpedance amplifiers 70 and 72.

As well as using TPA for measuring optical power for control purposes it will be appreciated that it can additionally be exploited for other purposes such as non-destructive fault testing. For example, in a photonics integrated device TPA occurs throughout its optical path length or lengths and so one can detect a photocurrent anywhere in the circuit that has a suitable electrode, for example the bias control electrodes 24 or modulating electrodes 22 of the modulator described. Therefore electrodes which can detect TPA photocurrent can be used in order to monitor the guided power anywhere in the circuit where they are present and so can be used to determine lossy locations or regions. Measured photocurrent can be used to detect when a critical light loss is reached, in one or more locations or overall, and, when such a loss is reached, produce a fault warning signal which can be seen, for example by an operator, so that remedial action, such as replacement of the circuit, can be taken. This can be done at times when the device is not operating, that is when it is not being used to change a characteristic of a light signal passing through the device by sending a test signal, for example one carrying no information, through the device.

It will be appreciated that the present invention is not restricted to the specific embodiment described and that modifications can be made which are within the scope of the invention. For example whilst the specific embodiment described was a Mach Zehnder type optical modulator it will be appreciated that the invention can be applied to other forms of optical modulators such as electro-absorption or phase modulation type modulators which generally comprise only a single waveguide. Further it will be appreciated that the invention is suited to other forms of optical devices such as, for example, beam formers for phased array antennas, multisection lasers, optical add-drop multiplexers (ADMUX), optical cross connection or any optical device having a waveguide of semiconductor material which exhibits TPA at the intended operating wavelength but preferably has a negligible low linear interband absorption.

The present invention resides in using two-photon absorption (TPA) to measure optical power within a semiconductor waveguide. Such an arrangement can be readily monolithically integrated into the optical device by, for example, the provision of electrodes on the waveguide and obviates the need for regrowth processing or optical splitters.

We claim:

1. A photonic integrated device, comprising:

a) a waveguide of semiconductor material which is monolithically integrated into the device and which has a low linear absorption at an intended wavelength of operation of the device, said device being arranged to perform a discernible change in a characteristic of light generated by it, passing through it or absorbed by it; and b) an optical power detector including means associated with said waveguide for measuring a photocurrent generated in the waveguide by two photon absorption to provide a measure of optical power within the waveguide without substantially affecting the light passing along the waveguide.

2. The device according to claim 1, in which the detector is an in-line device which detects light passing through the waveguide on its way to be used in a subsequent operation.

3. The device according to claim 2, in which the detector is a power tap which taps-off a small amount of light within the waveguide.

4. The device according to claim 1, in which the means includes at least one electrode provided on the waveguide.

5. The device according to claim 4, in which said at least one electrode forms a Schottky contact with the waveguide semiconductor material.

6. The device according to claim 5, in which said at least one electrode comprises metallic aluminum.

7. The device according to claim 1, in which the waveguide semiconductor material comprises gallium arsenide and gallium aluminum arsenide.

8. The device according to claim 1, in which the device is selected from a group of devices including an interferometer, a photodiode, a phase shifter, a modulator, a coupler, a grating, a filter, a beam former, a laser, an optical add-drop multiplexer, an optical cross connection, and a Mach-Zehnder modulator.

9. A method of measuring optical power in a photonics integrated device having a waveguide of semiconductor material which is monolithically integrated into the device and which has a low linear absorption at an intended wavelength of operation of the device, said device being arranged to perform a discernible change in a characteristic of light generated by it, passing through it or absorbed by it, the method comprising the step of: measuring a photocurrent generated in the waveguide by two photon absorption to provide a measure of optical power within the waveguide without substantially affecting the light passing along the waveguide.

10. The method according to claim 9; and further comprising the step of using a measured optical power to control the operation of the device.

* * * * *